United States Patent
Parnin et al.

(10) Patent No.: US 8,833,086 B2
(45) Date of Patent: Sep. 16, 2014

(54) LUBRICATION ARRANGEMENT FOR A GAS TURBINE ENGINE GEAR ASSEMBLY

(75) Inventors: Francis Parnin, Suffield, CT (US);
Erick Ramos, Manchester, CT (US);
Anthony Spagnoletti, Newington, CT (US)

(73) Assignee: United Technologies Corporation, Hartford, CT (US)

( * ) Notice: Subject to any disclaimer, the term of this patent is extended or adjusted under 35 U.S.C. 154(b) by 21 days.

(21) Appl. No.: 13/484,935

(22) Filed: May 31, 2012

(65) Prior Publication Data

US 2013/0318939 A1    Dec. 5, 2013

(51) Int. Cl.
F02C 7/00    (2006.01)
F02C 7/06    (2006.01)
F01D 25/18    (2006.01)

(52) U.S. Cl.
USPC .......................... 60/779; 60/39.08; 184/6.11

(58) Field of Classification Search
CPC ...... F01D 25/18; F01D 25/20; F16N 2210/00
USPC ......... 60/779, 39.08, 39.091, 39.83; 181/6.11
See application file for complete search history.

(56) References Cited

U.S. PATENT DOCUMENTS

| | | | |
|---|---|---|---|
| 4,170,873 A | 10/1979 | Milo | |
| 4,245,465 A | 1/1981 | Milo | |
| 4,309,870 A | 1/1982 | Guest et al. | |
| 4,629,033 A | 12/1986 | Moore et al. | |
| 4,741,152 A | 5/1988 | Burr et al. | |
| 5,107,676 A | 4/1992 | Hadaway et al. | |
| 5,610,341 A | 3/1997 | Tortora | |
| 6,058,694 A | 5/2000 | Ackerman et al. | |
| 6,619,030 B1 * | 9/2003 | Seda et al. | 60/226.1 |
| 7,163,086 B2 | 1/2007 | Care et al. | |
| 7,387,189 B2 | 6/2008 | James et al. | |
| 8,051,869 B2 | 11/2011 | Parnin et al. | |
| 2006/0081419 A1 | 4/2006 | Care et al. | |
| 2010/0011740 A1 * | 1/2010 | McVey | 60/204 |
| 2010/0025158 A1 | 2/2010 | Allam | |
| 2010/0065374 A1 | 3/2010 | Szolomayer et al. | |

(Continued)

FOREIGN PATENT DOCUMENTS

| | | |
|---|---|---|
| EP | 1333156 B1 | 9/2006 |
| EP | 2559913 A1 | 2/2013 |
| JP | 07332016 A | 12/1995 |

OTHER PUBLICATIONS

International Search Report and Written Opinion for International Application No. PCT/US2013/042360 completed on Jul. 26, 2013.

*Primary Examiner* — Gerald L Sung
(74) *Attorney, Agent, or Firm* — Carlson, Gaskey & Olds

(57) ABSTRACT

An exemplary apparatus for supplying lubricant to a gear assembly in a gas turbine engine includes a valve having a valve inlet configured to be coupled to a source of lubricant. A valve outlet is configured to direct lubricant to the gear assembly. The valve is selectively controllable into a plurality of settings for varying an amount of lubricant flowing from the valve inlet to the valve outlet. A bypass is associated with the valve. The bypass has an inlet configured to receive lubricant from the source and an outlet configured to direct lubricant to the gear assembly. The bypass permits at least a selected amount of lubricant to flow to the gear assembly independent of a setting of the valve.

18 Claims, 2 Drawing Sheets

(56) References Cited

U.S. PATENT DOCUMENTS

| | | |
|---|---|---|
| 2010/0212281 A1 | 8/2010 | Sheridan |
| 2010/0236213 A1 * | 9/2010 | Schilling .............. 60/39.08 |
| 2011/0108360 A1 | 5/2011 | DiBenedetto |
| 2011/0130246 A1 | 6/2011 | McCune et al. |
| 2011/0150655 A1 | 6/2011 | Tietze et al. |

* cited by examiner

LUBRICATION ARRANGEMENT FOR A GAS TURBINE ENGINE GEAR ASSEMBLY

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. A direct drive gas turbine engine includes a fan section driven by the low spool such that the low pressure compressor, low pressure turbine and fan section rotate at a common speed in a common direction.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that the turbine section and the fan section can rotate at closer to respective optimal speeds.

One of the challenges associated with including such a gear assembly is that it requires lubrication. There have been various proposals for supplying lubricant to a gas turbine engine gear assembly.

SUMMARY

An exemplary apparatus for supplying lubricant to a gear assembly in a gas turbine engine includes a valve having a valve inlet configured to be coupled to a source of lubricant and a valve outlet configured to direct lubricant to the gear assembly. The valve is selectively controllable into a plurality of settings for varying an amount of lubricant flowing from the valve inlet to the valve outlet. A bypass associated with the valve has a bypass inlet configured to receive lubricant from the source of lubricant and a bypass outlet configured to direct lubricant to the gear assembly. The bypass permits at least a selected amount of lubricant to flow to the gear assembly independent of a setting of the valve.

In an embodiment having one or more features of the embodiment of the preceding paragraph, the valve comprises a valve housing and wherein the bypass is situated within the valve housing.

In an embodiment having one or more features of any of the embodiments of the preceding paragraphs, the valve comprises a valve housing and wherein the bypass is outside of the valve housing.

In an embodiment having one or more features of any of the embodiments of the preceding paragraphs, the bypass comprises a flow restrictor that controls an amount of lubricant that flows through the bypass.

In an embodiment having one or more features of any of the embodiments of the preceding paragraphs, the bypass is configured to permit a fixed maximum amount of lubricant flow through the bypass.

In an embodiment having one or more features of any of the embodiments of the preceding paragraphs, the valve comprises a return outlet that is configured to direct lubricant toward the lubricant supply responsive to the valve setting restricting an amount of lubricant that can flow through the valve outlet to an amount that is less than an amount that is received at the valve inlet.

An exemplary gas turbine engine includes a fan having a plurality of fan blades rotatable about an axis, a compressor section, a combustor in fluid communication with the compressor section, a turbine section in fluid communication with the combustor, a geared architecture configured to be driven by the turbine section for rotating the fan about the axis, and a lubrication arrangement for supplying lubricant to the geared architecture. The lubrication arrangement includes a source of lubricant, a valve and a bypass associated with the valve. The valve includes a valve inlet that receives lubricant from the source and a valve outlet that directs lubricant to the geared architecture. The valve is selectively controllable into a plurality of settings for varying an amount of lubricant flowing from the valve inlet to the valve outlet. The bypass has a bypass inlet that receives lubricant from the source and a bypass outlet that directs lubricant to the gear assembly. The bypass permits at least a selected amount of lubricant to flow to the geared architecture independent of a setting of the valve.

In an embodiment having one or more features of the embodiment of the preceding paragraph, the valve comprises a valve housing and wherein the bypass is situated within the valve housing.

In an embodiment having one or more features of any of the embodiments of the preceding paragraphs, the valve comprises a valve housing and the bypass is outside of the valve housing.

In an embodiment having one or more features of any of the embodiments of the preceding paragraphs, the bypass comprises a flow restrictor that controls an amount of lubricant that flows through the bypass.

In an embodiment having one or more features of any of the embodiments of the preceding paragraphs, the bypass is configured to permit a fixed maximum amount of lubricant flow through the bypass.

In an embodiment having one or more features of any of the embodiments of the preceding paragraphs, the valve comprises a return outlet that is configured to direct lubricant toward the lubricant supply responsive to the valve setting restricting an amount of lubricant that can flow through the valve outlet to an amount that is less than an amount that is received at the valve inlet.

An exemplary method of supplying lubricant to a geared architecture in a gas turbine engine a selectively controllable valve and a bypass associated with the valve, includes directing a selected first amount of lubricant to the geared architecture through the valve and directing a second amount of lubricant to the geared architecture through the bypass. The second amount is independent of the first amount.

In an example embodiment having one or more features of the embodiment of the preceding paragraph, the bypass includes a restrictor and the method includes controlling the second amount via the restrictor.

The various features and advantages of disclosed examples will become apparent to those skilled in the art from the following detailed description. The drawings that accompany the detailed description can be described as follows.

DETAILED DESCRIPTION

Figure 1:
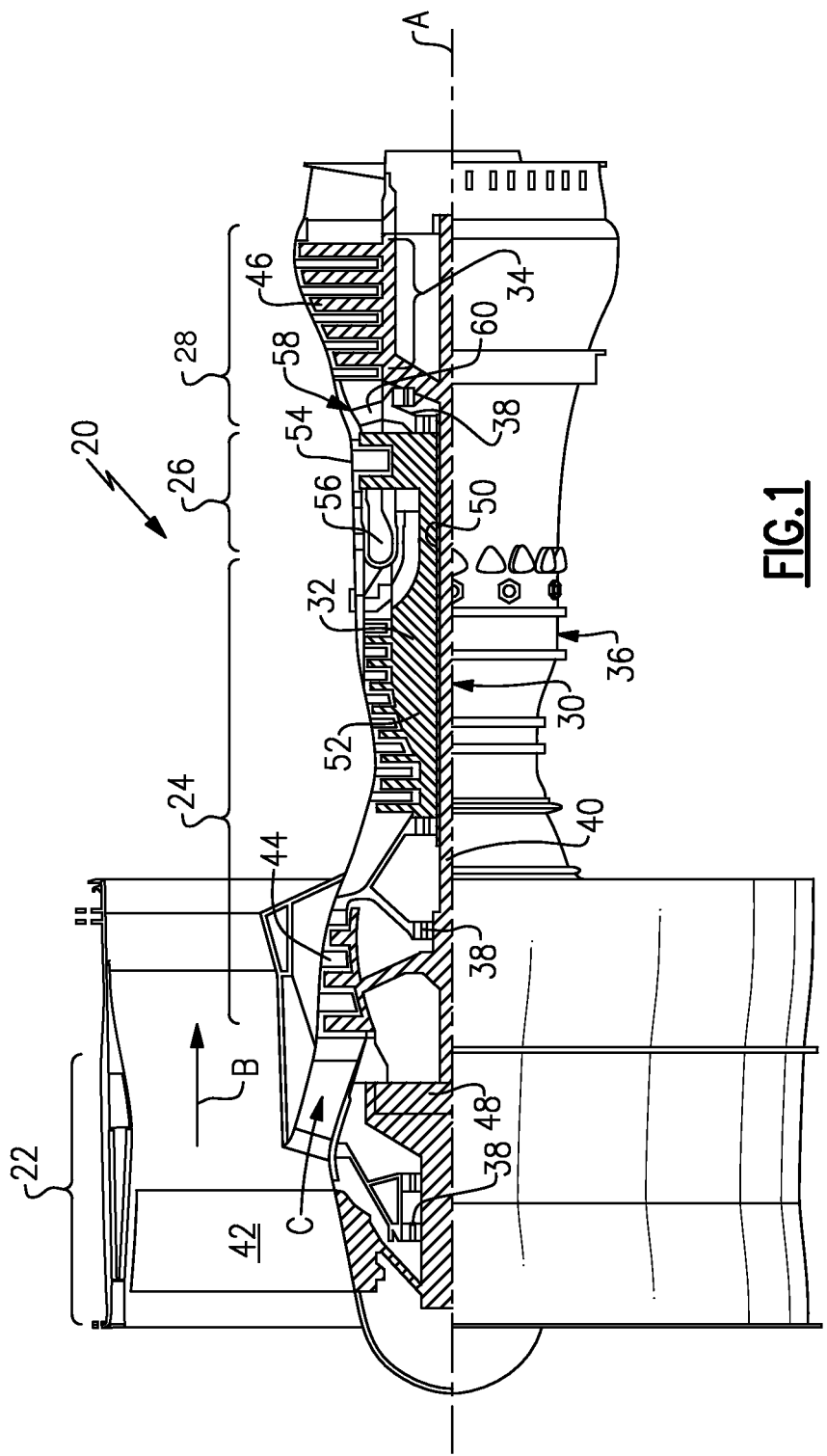
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts disclosed in this description and the accompanying drawings are not limited to use with turbofans as the teachings may be applied to other types of turbine engines, such as a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used in this description, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 and sets airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/518.7)^{0.5}]$. The "Low corrected fan tip speed", according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
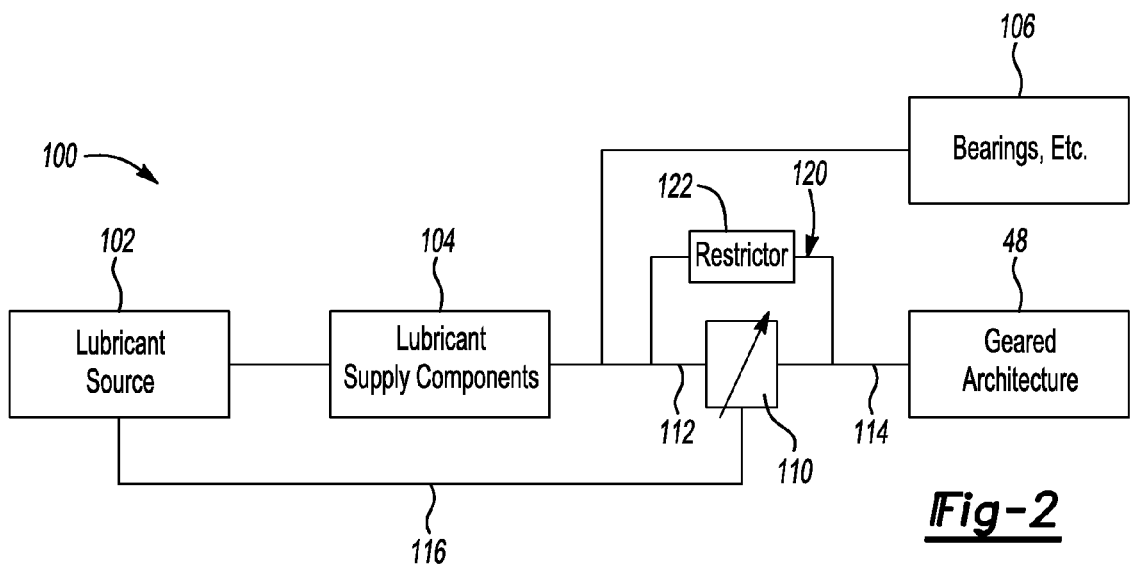
FIG. 2 schematically illustrates an example lubrication arrangement for supplying lubricant to a gear assembly within a gas turbine engine.

FIG. 2 schematically illustrates a lubrication arrangement 100 for supplying lubricant to the geared architecture 48. A lubricant source 102, which may comprise a tank, contains a supply of lubricant, such as oil. Lubricant supply components are schematically illustrated at 104. Example lubricant supply components include conduits for carrying the lubricant, a cooler for controlling a temperature of the lubricant and pump or another device for pressurizing the lubricant. Any or all of these may be included in the components 104, depending on the embodiment.

In the example of FIG. 2, lubricant from the source 102 also is provided to other components schematically shown at 106. Examples of components that require lubrication include journal bearings within the engine 20, bearing compartments and any accessory gear box. Any or all of these may be the components shown at 106.

The lubrication arrangement 100 of FIG. 2 includes a valve 110 that controls the supply of lubricant to the geared architecture 48. Lubricant from the source 102 enters the valve through a valve inlet 112. The valve 110 is selectively controllable to vary an amount of lubricant provided at a valve outlet 114 for delivering the lubricant to the geared architecture 48. In one example, the valve 110 comprises a spool valve that includes a moveable spool (not illustrated) for controlling an amount of flow through the valve 110. Spool valves are known. Other valve configurations are used in other embodiments.

In some embodiments a known valve control procedure is used to control the setting of the valve 110. There are known techniques for varying valve settings based upon gas turbine engine operation. One such known technique is used in an example embodiment for purposes of controlling the setting of the example valve 110.

The example valve 110 of FIG. 2 includes a return outlet 116 that is coupled with the lubricant source 102. The return outlet 116 permits lubricant to return to the lubricant source 102 as may be needed based on flow or pressure conditions. For example, in the event that the valve setting restricts the amount of lubricant flowing through the outlet 114 to the geared architecture 48 to an amount that is less than the amount received at the valve inlet 112. The return outlet 116 permits some of the lubricant to exit the valve 110 and return to the source 102.

The lubrication arrangement of FIG. 2 includes a bypass 120 associated with the valve 110. The bypass 120 receives lubricant from the source 102 and directs lubricant to the geared architecture 48. The bypass 120 permits at least a selected amount of lubricant to flow to the geared architecture 48 independent of a setting of the valve 110. In the illustrated example, the bypass 120 includes a restrictor 122 that places an upper limit on the amount of lubricant permitted to flow through the bypass 120.

Having the bypass 120 ensures that at least a minimum amount of lubricant flow is provided to the geared architecture 48 regardless of pressure within the lubrication arrangement 100. The bypass 120 ensures an appropriate level of lubrication for the geared architecture 48 because it always allows at least a minimum amount of lubricant to be delivered to the geared architecture 48. In addition, the bypass 120 reduces the amount of flow that the valve 110 must accommodate because the valve 110 is not solely responsible for delivering lubricant to the geared architecture 48.

Without the bypass 120 in place as schematically shown in FIG. 2, the size of the valve 110 has to accommodate the maximum amount of flow required by the geared architecture 48. At the same time, the valve 110 must be able to withstand the various pressures experienced within the lubrication arrangement 100. Including the bypass 120 allows for using smaller valve components for realizing the valve 110. The bypass 120, therefore, presents cost, weight and size savings compared to an arrangement that does not include the bypass 120. The illustrated arrangement allows for a more economical valve arrangement within a gas turbine engine for lubricating a geared architecture.

Figure 3:
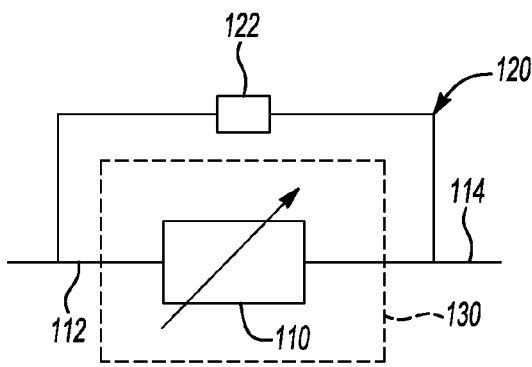
FIG. 3 schematically illustrates an example valve and bypass configuration.

FIG. 3 schematically illustrates an example configuration in which the bypass 120 is situated outside of a housing 130 of the valve 110. The example of FIG. 3 allows for incorporating the bypass 120 without having to change the configuration of a valve 110.

Figure 4:
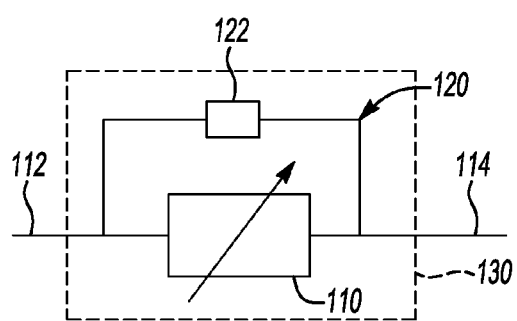
FIG. 4 schematically illustrates another example valve and bypass configuration.

FIG. 4 illustrates another example configuration in which the bypass 120 is incorporated as part of the valve 110. In this example, the bypass 120 is at least partially situated within the housing 130 of the valve 110. Given this description, those skilled in the art will realize whether a configuration like that shown in FIG. 3 will work better for their particular situation compared to a configuration like that shown in FIG. 4.

The bypass 120 reduces the overall requirements for lubricant flow through the valve 110 while still maintaining the minimum and maximum flow requirements for supplying lubricant to the geared architecture 48. Reducing the amount of flow that has to be accommodated by the valve 110 allows for reducing the valve size, weight and cost. Reduced size and weight are considered valuable features for components that are incorporated into a gas turbine engine because of the tight packing constraints imposed on such engines and because reduced weight can be associated with increased engine efficiency.

Although the different examples have the specific components shown in the illustrations, embodiments of this invention are not limited to those particular combinations. It is possible to use some of the components or features from one of the examples in combination with features or components from another one of the examples.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of supplying lubricant to a geared architecture in a gas turbine engine, the method comprising:
    providing a fan including a plurality of fan blades rotatable about an axis;
    situating a geared architecture for rotating the fan about the axis;
    providing a lubrication arrangement for supplying lubricant to the geared architecture, the lubrication arrangement including a source of lubricant, having a selectively controllable valve and a bypass associated with the valve;
    selectively directing lubricant from the source to the geared architecture through the selectively controllable valve; and
    always directing lubricant to the geared architecture through the bypass associated with the valve independent of an amount of the lubricant directed through the selectively controllable valve;

wherein the bypass includes a restrictor, and the method comprises controlling the restrictor to alter an amount of lubricant directed through the bypass to the geared architecture.

2. The method of claim 1, comprising always ensuring at least a minimum amount of lubricant can be delivered to the geared architecture through the bypass.

3. The method of claim 1, wherein the bypass is configured to permit a fixed maximum amount of lubricant flow through the bypass.

4. The method of claim 1, wherein the valve comprises a return outlet that is configured to direct lubricant toward the lubricant supply responsive to the valve setting restricting an amount of lubricant that can flow through the valve outlet to an amount that is less than an amount that is received at the valve inlet.

5. The method of claim 1, wherein there is a pressure ratio across the fan blades, the pressure ratio being less than about 1.50.

6. The method of claim 5, wherein the pressure ratio is less than about 1.45.

7. The method of claim 1, wherein the gas turbine engine comprises an engine core and there is a bypass ratio of air flow through the fan to air flow into the core, the bypass ratio being greater than about 6:1.

8. The method of claim 7, wherein the bypass ratio is greater than about 10:1.

9. The method of claim 1, wherein the geared architecture comprises an epicyclical gear train.

10. The method of claim 9, wherein the geared architecture has a gear reduction ratio of greater than 2.3.

11. The method of claim 1, wherein the geared architecture has a gear reduction ratio of greater than 2.3.

12. A method of supplying lubricant to a geared architecture in a gas turbine engine, the method comprising the steps of:
   providing a fan including a plurality of fan blades rotatable about an axis, wherein there is a pressure ratio across the fan blades, the pressure ratio being less than about 1.50;
   providing a geared architecture situated for rotating the fan about the axis, wherein the geared architecture has a gear reduction ratio of greater than 2.3;
   providing a lubrication arrangement for supplying lubricant to the geared architecture, the lubrication arrangement including a source of lubricant, having a selectively controllable valve and a bypass associated with the valve;
   selectively directing lubricant from the source to the geared architecture through the selectively controllable valve; and
   constantly directing lubricant to the geared architecture through the bypass associated with the valve independent of an amount of the lubricant directed through the selectively controllable valve;
   wherein the bypass includes a restrictor, and the method comprises controlling the restrictor to alter an amount of lubricant directed through the bypass to the geared architecture.

13. The method of claim 12, wherein the bypass is configured to permit a fixed maximum amount of lubricant flow through the bypass.

14. The method of claim 12, wherein the valve comprises a return outlet that is configured to direct lubricant toward the lubricant supply responsive to a valve setting restricting an amount of lubricant that can flow through the valve outlet to an amount that is less than an amount that is received at the valve inlet.

15. The method of claim 12, wherein the pressure ratio is less than about 1.45.

16. The method of claim 12, wherein the gas turbine engine comprises an engine core and there is a bypass ratio of air flow through the fan to air flow into the core, the bypass ratio being greater than about 6:1.

17. The method of claim 16, wherein the bypass ratio is greater than about 10:1.

18. The method of claim 12, wherein the geared architecture comprises an epicyclical gear train.

\* \* \* \* \*